(12) United States Patent
O'Dwyer et al.

(10) Patent No.: US 9,239,815 B2
(45) Date of Patent: Jan. 19, 2016

(54) VEHICLE CONTROL SYSTEM

(75) Inventors: Denis O'Dwyer, Tullamore (IE); Eric Gallagher, Ballyshannon (IE); Bernie Gallagher, Clane (IE)

(73) Assignee: ATSR Limited, Tullamore (IE)

( * ) Notice: Subject to any disclaimer, the term of this patent is extended or adjusted under 35 U.S.C. 154(b) by 309 days.

(21) Appl. No.: 13/575,310

(22) PCT Filed: Jan. 25, 2011

(86) PCT No.: PCT/EP2011/051000
§ 371 (c)(1),
(2), (4) Date: Dec. 21, 2012

(87) PCT Pub. No.: WO2011/092166
PCT Pub. Date: Aug. 4, 2011

(65) Prior Publication Data
US 2013/0116858 A1    May 9, 2013

(30) Foreign Application Priority Data

Jan. 26, 2010    (IE) .................................. S2010/0035

(51) Int. Cl.
*G06F 17/00* (2006.01)
*B60W 10/06* (2006.01)
*B60W 20/00* (2006.01)
(Continued)

(52) U.S. Cl.
CPC ................ *G06F 17/00* (2013.01); *B60R 25/00* (2013.01); *F02D 41/042* (2013.01); *F02N 11/0814* (2013.01)

(58) Field of Classification Search
CPC ....... G06F 17/00; B60W 20/00; B60W 10/06; B60W 10/08

USPC ................................................ 701/2, 36, 113
See application file for complete search history.

(56) References Cited

U.S. PATENT DOCUMENTS 3,478,730 A    11/1969    Bucher
3,793,529 A *    2/1974    Bucher .......................... 290/33
(Continued)

FOREIGN PATENT DOCUMENTS

DE            10163227 A1    7/2003
DE       102007010488 A1    9/2008

OTHER PUBLICATIONS

International Search Report, PCT Application No. PCT/EP2011/051000, dated Jun. 1, 2011.
(Continued)

*Primary Examiner* — Calvin Cheung
*Assistant Examiner* — Martin Weeks
(74) *Attorney, Agent, or Firm* — Dinsmore & Shohl LLP

(57) ABSTRACT

The present invention provides a vehicle control system, for example for use with an emergency services vehicle such as an ambulance, fire engine, police car or the like, and which provides enhanced security, functionality and improved fuel consumption for such vehicles when at the scene of a situation such as a fire, accident, or the like, the system being operable to permit an engine of the vehicle to remaining running while simultaneously immobilizing the vehicle. Furthermore when configurable parameters such as but not limited to battery levels and or internal vehicle temperatures are reached, such a control system, without any human interface, automatically shuts down the engine to reduce fuel burn, reduce emissions, reduce engine wear and maintenance and thereby promote a greener environment.

20 Claims, 1 Drawing Sheet

(51) Int. Cl.
  *B60R 25/00* (2013.01)
  *F02D 41/04* (2006.01)
  *F02N 11/08* (2006.01)

(56) References Cited

U.S. PATENT DOCUMENTS

| | | | |
|---|---|---|---|
| 4,754,838 A | 7/1988 | Cody | |
| 6,885,285 B2* | 4/2005 | Losey | 340/5.72 |
| 2004/0075538 A1* | 4/2004 | Flick | 340/426.1 |
| 2005/0020212 A1* | 1/2005 | Hiramitsu et al. | 455/41.2 |
| 2007/0222292 A1* | 9/2007 | Shimomura | 307/10.3 |
| 2007/0262749 A1* | 11/2007 | Luan et al. | 320/132 |
| 2009/0146846 A1* | 6/2009 | Grossman | 340/988 |
| 2009/0158079 A1* | 6/2009 | Chung et al. | 714/2 |
| 2009/0267733 A1* | 10/2009 | Teramura et al. | 340/5.61 |
| 2009/0312894 A1* | 12/2009 | Meltser et al. | 701/19 |
| 2011/0202210 A1* | 8/2011 | Goda | 701/22 |

OTHER PUBLICATIONS

Written Opinion Report, PCT Application No. PCT/EP2011/051000, dated Apr. 23, 2012.

* cited by examiner

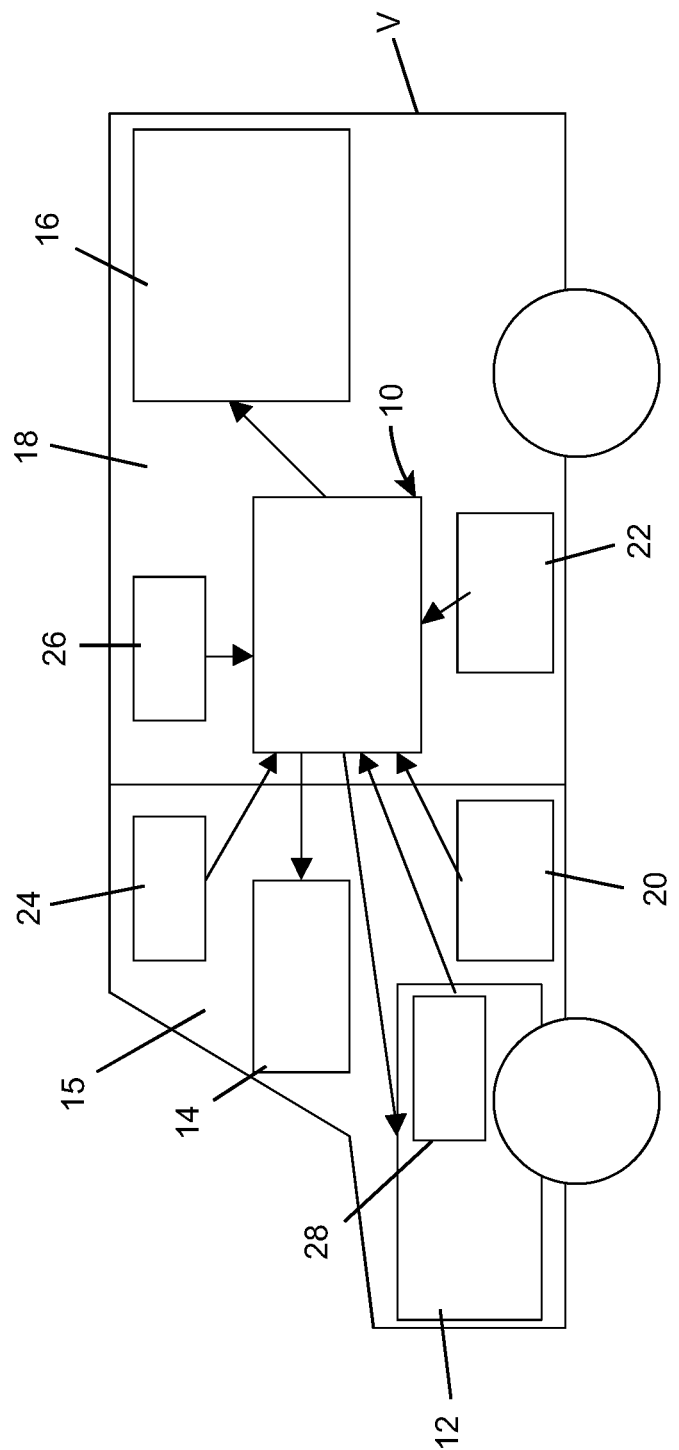

VEHICLE CONTROL SYSTEM

FIELD OF THE INVENTION

This invention relates to a vehicle control system, and in particular a vehicle control system for use in an emergency services vehicle such as an ambulance, fire engine, police vehicle or the like, and which provides enhanced security, functionality and improved fuel consumption for such vehicles when at the scene of a situation such as a fire, accident, or the like.

BACKGROUND OF THE INVENTION

Emergency services vehicles, for example ambulances, fire engines and police vehicles, during day to day operations, are required to attend the scenes of various incidents such as fires, accidents, or the like. At these scenes the occupants of the emergency services vehicle will generally be absent from the vehicle for extended periods while attending to the scene. During these periods of absence the emergency services vehicle is at the risk of being stolen or otherwise tampered with. This issue is compounded by the fact that it is often necessary to leave the ignition key in the vehicle, and the vehicle running, in order to ensure that other systems of the vehicle remain operational, for example equipment running on the vehicle's batteries, such as life-support equipment in an ambulance, radios, etc.

In addition it is normal practice for such emergency services vehicles to be operational when the vehicle is at the start of a shift, when it may be parked up in the ambulance parking lot/depot and left running/engine idling. This is necessary to ensure reduced emergency response duration, vehicle readiness for an emergency response call and that such vehicles such as ambulances are at a comfortable temperature for to promote patient comfort and care etc. This idle time will normally far exceed any idle time at the scene of an accident/incident. Controlling/managing this non incident engine idling time has a far greater effect in reducing fuel burn, carbon footprint, engine wear, service intervals, etc.

It is therefore an object of the present invention to provide a vehicle control system, in particular for use with emergency service vehicles, which addresses the above-mentioned problems.

SUMMARY OF THE INVENTION

According to a first aspect of the present invention there is provided a vehicle control system adapted to permit an engine of the vehicle to remain operational while immobilising the vehicle.

Preferably, the system is adapted to maintain operation of the engine after an ignition of the engine has been disabled.

Preferably, the system is adapted to turn off the engine in response to one or more events.

Preferably, the system is adapted to turn off the engine in response to an unauthorised attempt to operate and/or move the vehicle.

Preferably, the system is adapted to automatically turn off the engine when one or more vehicle batteries have reached a predefined upper charge level.

Preferably, the system is adapted to automatically turn on the engine when one or more vehicle batteries drop below a predefined lower charge level.

Preferably, the system is adapted to automatically activate an air conditioning/climate control system of the vehicle when a temperature within an area of the vehicle has reached a predetermined upper or lower temperature level, and to automatically control the air conditioning/climate control system in order to achieve predetermined environmental conditions within said area.

Preferably, the system is adapted to automatically deactivate an air conditioning/climate control system of the vehicle when predetermined environmental conditions within an area of the vehicle have been achieved.

Preferably, the system comprises one or more sensors operable to provide feedback regarding one or more parameters of the vehicles state.

Preferably, the one or more sensors are operable to enable closed loop control of one or more parameters of the vehicles state.

Preferably, the system is operable to automatically lock or unlock one or more doors of the vehicle.

Preferably, the system comprises a communication module operable to enable the remote operation of the control system According to a second aspect of the present invention there is provided a vehicle comprising a vehicle control system according to the first aspect of the invention.

As used herein, the term "ignition" is intended to mean an ignition system of a vehicle which is operable to both start an engine of the vehicle, and to stop the engine of the vehicle, and which may be actuated by means of a conventional ignition key or any other functional equivalent, such as an ignition button, an electronic fob, wirelessly, from a remote location, or otherwise.

As used herein, the term "immobilising" is intended to mean preventing the vehicle from being moved, whether such movement is through power supplied by an engine of the vehicle or through other means, and such immobilisation may for example be implement by preventing power being transmitted from the engine to the wheels of the vehicle and/or by applying one or more brakes to the wheels of the vehicle, or by any other suitable means.

As used herein, the term "engine" is intended to mean a machine or collection of machines capable of converting a fuel supply into work, in particular mechanical motion, and such an engine may take the form of an internal combustion engine such as a petrol or diesel powered engine, one or more electric engines, or a "hybrid" type engine.

BRIEF DESCRIPTION OF THE DRAWING

FIG. 1 illustrates a schematic representation of a vehicle employing a vehicle control system according to an embodiment of the present invention.

DETAILED DESCRIPTION OF THE DRAWING

Referring now to the accompanying drawing there is illustrated a schematic representation of an emergency services vehicle V, in which a vehicle control system 10 according to an embodiment of the present invention is installed. The control system 10 is adapted, as will be described in detail hereinafter, to enable an engine 12 of the vehicle V to be left running, for example idling, while simultaneously immobilising the vehicle V. This ensures that no unauthorised tampering with or moving of the vehicle V can occur, despite the engine 12 running, in order to provide power to other vehicle's systems, as described hereinafter in detail. It will be appreciated from the following description of the operation of the system 10 that while the control system 10 is shown at a particular location within the vehicle V, and as a single unit, the control system 10 may be located in any other suitable position, and may comprise a distributed system having components thereof in disparate locations about the vehicle V and optionally being fully or partially integrated into existing elements or systems of the vehicle V.

The control system 10 is preferably hard wired into the vehicle V and connected to various other vehicle systems, for example a first air conditioning and/or climate control system 14 located in a cab 15 of the vehicle, a second air-conditioning and/or climate control system 16 located, in the embodiment illustrated, in a patient compartment 18 for example when the vehicle V is in the form of an ambulance or the like. The control system 10 is also preferably in operative association with at least a main vehicle battery 20 and, where applicable, one or more auxiliary vehicle batteries 22 which may for example be used to power life support systems or the like of the emergency services vehicle V. The batteries may of course be associated with any other equipment or systems, for example supplying power to one or more sirens, lights, horns, etc forming part of the emergency services vehicle V, and the equipment or systems may of course vary depending on the type of emergency services vehicle to which the control system 10 is fitted.

The control system 10 may also comprise a number of sensors to provide feedback to the control system 10 in order to allow the closed loop control of one or more of the vehicle's systems. For example the control system 10 may comprise a first temperature sensor 24 located a first area or zone of the vehicle, for example in the patient compartment 18, a second temperature sensor 26 located in a second area or zone of the vehicle, for example the cab 15, and a third temperature sensor 28 located adjacent to, or integrated with, or otherwise operative associated with the engine 12 or subsystem thereof.

Turing then to the operation of the control system 10, the vehicle V, for example following arrival at the scene of an incident, can be activated and switched by suitable means into an idle state in which the engine 12 can remain running, but the vehicle V is immobilised. This idle state may be engaged by any number of suitable means, for example by entering a pin code or the like on a suitable panel, or by a remote control which remains with the vehicle operator once they have vacated the vehicle V. The control system 10 may immobilise the vehicle V in any number of suitable ways, for example by utilising existing vehicle systems. One such manner of immobilisation may be that the control system 10 applies the brakes of the vehicle V, disengages the vehicle's clutch, applies a steering lock to the vehicle V, or by any other suitable means.

The control system 10 may also be adapted to permit the remote actuation thereof. As an example, the system 10 may include a communication module (not shown) operable to permit data communication between the control system 10 and a remote location. Thus on arrival at the scene of an incident, the driver or other authorised occupant of the vehicle could communicate with the remote location, requesting that the control system 10 be activated. This communication may take any suitable form, and may require authentication, for example by means of a password, pin code, fingerprint scan or the like. Once the request has been authenticated, the remote location can then send a remote command to the control system 10 in order to activate same. It will be appreciated that a similar procedure may then be employed in order to de-active the control system 10.

The control system 10 is preferably also operable to allow the engine 12 to remain running even when an ignition (not shown) of the vehicle has been disengaged or disabled, for example by removing the ignition key from the ignition. This then allows the driver of the vehicle or other authorised person to remove and retain the keys of the vehicle V, while the engine 12 remains running, in order to power the batteries 20, 22 and allow the control system 10 to maintain operation of various other of the system vehicles, for example life support equipment in an ambulance or radio equipment of the like.

The control system 10 is also operable to monitor the temperature and/or other environmental conditions within the cab 15 and the patient compartment 18, and if necessary to activate the first air conditioning system 14 or the second air conditioning system 16 in order to bring the temperature and/or humidity within the cab 15 and/or the patient compartment 18 to a desired or predefined level. This may be particularly important when the control system 10 is fitted to an ambulance, where it is desired to maintain a patient located in the patient compartment 18 in a comfortable condition, or simply to maintain the patient compartment 18 at suitable environmental conditions in readiness for receiving a patient. Thus the temperature sensors 24, 26 may be utilised to continually monitor the temperature and/or other environmental conditions in the cab 15 and/or the patient compartment 18, and provide feedback to the control system 10. If a predefined upper or lower temperature or humidity level is reached, the control system 10 can automatically activate or deactivate the first or second air conditioning systems 14, 16 in order to bring the temperature and/or humidity back to a predefined or acceptable level, which may of course be set via a suitable interface (not shown) within the cab 15 and/or the patient compartment 18.

The control system 10 is preferably also operable to monitor the charge state of one or both of the batteries 20, 22, which may be used to power auxiliary systems of the vehicle V. The control system 10 may be configured to automatically switch off the engine 12, without any human interface, when the batteries 20, 22 have reached a predefined upper charge level, and similarly the control system 10 may be operable to restart the engine 12, again automatically and without any human interface, if the charge level within the batteries 20, 22 drops below a predefined charge level, such that the engine 12 can then begin recharging the batteries, 20, 22. If the batteries 20, 22 or other monitored systems of the vehicle V are charged through means other that the engine 12, the control system 10 would then be adapted to activate or deactivate the relevant charging equipment. The control system 10 is also preferably wired or otherwise connected to or in communication with sensors provided as standard on the vehicle V, for example for measuring the charge state of the batteries 20, 22, a fuel gauge (not shown), door locks, etc, such as to be capable of using data from these sensors during operation of the control system 10.

The control system 10 may of course be operable to control other systems of the vehicle. For example the control system 10 may be operable to automatically lock/unlock one or more doors (not shown) of the vehicle once the idle state has been engaged. This functionality can further reduce the possibility of unauthorised access and/or tampering with the vehicle V. The system 10 may also be operated when the vehicle V is not at the scene of an incident or accident, for example when an ambulance or other emergency services vehicle is on standby in a parking lot or at a base/hospital and where the vehicle is left idling to have it ready for an emergency call, thus ensuring that the vehicle V is fully warmed up, and all batteries and systems are at the correct level. The patient compartment 18 of an ambulance will then also be at a comfortable temperature, thus providing added patient comfort care.

The control system 10 may be adapted to send data to a remote location such as a control centre in order to permit the monitoring or automatic notification of data regarding one or more of the vehicle systems, regardless of whether or not the engine 12 is running. Thus for example the control system 10 may be operable to communicate information regarding the charge state of one or more batteries of the vehicle V, the fuel level of the vehicle, the location of the vehicle via GPS coordinates or the like, and any other desired information.

The control system 10 of the present invention thus allows an emergency services team to leave the engine 12 running or "idling" in order to provide power to all auxiliary equipment within the vehicle V, while providing peace of mind that the vehicle V will not be stolen or otherwise tampered with while the emergency services team have vacated the vehicle V. The system 10 also ensures reduced emissions, reduces fuel consumption, and therefore a reduced carbon footprint, by automatically switching off the engine 12 when not needed, for example if the temperature inside the vehicle has reached a desired level and/or the vehicles batteries are fully charged. This in turn provides reduced engine wear and reduced maintenance, and thus reduced vehicle/fleet-running costs. The control system 10 also provides, where the vehicle V is an ambulance or the like, increased patient comfort and increased vehicle response time.

The invention claimed is:

1. A vehicle control system configured to permit an engine of a vehicle to remain operational while immobilizing the vehicle, the system comprising:
   one or more sensors operable to provide feedback regarding, and enable closed loop control of, one or more parameters of the vehicle;
   the system being configured:
      to maintain running operation of the engine after an ignition of the engine has been disabled,
      to turn off the engine in response to one or more events detected by the one or more sensors only while the vehicle is immobilized,
      without any human interface to automatically restart the engine, and
      to control, closed loop, other vehicle systems based on the feedback from the one or more sensors regarding the one or more parameters of the vehicle state—while the running operation of the engine is maintained after the ignition of the engine has been disabled.

2. The vehicle control system according to claim 1 in which the system is configured to turn off the engine in response to an unauthorized attempt to operate and/or move the vehicle.

3. The vehicle control system according to claim 1 in which the system is configured to automatically turn off the engine when one or more vehicle batteries have reached a predefined upper charge level.

4. The vehicle control system according to claim 1 in which the system is configured to automatically turn on the engine when one or more vehicle batteries drop below a predefined lower charge level.

5. The vehicle control system according to claim 1 in which the system is configured to automatically activate a climate control system of the vehicle when a temperature within an area of the vehicle has reached a predefined upper or lower temperature level, and to automatically control the climate control system in order to achieve predefined environmental conditions within said area.

6. The vehicle control system according to claim 1 in which the system is configured to automatically deactivate a climate control system of the vehicle when predefined environmental conditions within an area of the vehicle have been achieved.

7. The vehicle control system according to claim 1 in which the system is operable to automatically lock or unlock one or more doors of the vehicle.

8. The vehicle control system according to claim 1 in which the system comprises a communication module operable to enable the remote operation of the control system.

9. A vehicle comprising a vehicle control system that is configured to permit an engine of the vehicle to remain operational while immobilizing the vehicle, the system comprising:
   one or more sensors operable to provide feedback regarding, and enable closed loop control of, one or more parameters of the vehicle;
   the system being configured:
      to maintain running operation of the engine after an ignition of the engine has been disabled,
      to turn off the engine in response to one or more events detected by the one or more sensors only while the vehicle is immobilized,
      without any human interface to automatically restart the engine, and
      to control, closed loop, other vehicle systems based on the feedback from the one or more sensors regarding the one or more parameters of the vehicle while the running operation of the engine is maintained after the ignition of the engine has been disabled.

10. A vehicle control system configured to permit an engine of a vehicle to remain running while simultaneously immobilizing the vehicle in order to provide power to other vehicle systems while preventing unauthorized moving of the vehicle, the vehicle control system comprising:
   one or more sensors operable to provide feedback regarding one or more parameters of the other vehicle systems, and
   the vehicle control system being configured:
      to maintain the engine in a running state after an ignition of the engine has been disabled in order to provide power from the engine to the other vehicle systems and to charge at least one vehicle battery which powers at least one of the other vehicle systems when the engine is not running, and
   while the ignition is disabled, the vehicle control system is configured:
      to immobilize the vehicle to prevent movement of the vehicle with the engine left in the running state,
      to control, closed loop, the other vehicle systems based on the feedback from the one or more sensors regarding the one or more parameters of the other vehicle systems with the engine left in the running state,
      to automatically turn the engine off from the running state in response to an event detected by the one or more sensors only while the vehicle is immobilized and without any human interface, and
      to automatically restart the engine in response to one other event detected by the one or more sensors only while the vehicle is immobilized and without any human interface via the ignition.

11. The vehicle control system according to claim 10 in which the vehicle is immobilized by the system via vehicle brakes being applied, a vehicle clutch being disengaged, or a vehicle steering lock being applied.

12. The vehicle control system according to claim 10 in which the event to automatically turn the engine off from the running state is an unauthorized attempt to operate the vehicle or when the at least one vehicle battery has reached a predefined upper charge level.

13. The vehicle control system according to claim 10 in which the ignition of the engine is disabled via entering a pin code into a control panel of the vehicle control system or by a remote control.

14. The vehicle control system according to claim 10 in which the other event to automatically restart the engine is when the at least one vehicle battery drops below a predefined lower charge level.

15. The vehicle control system according to claim 10 in which one of the other vehicle systems is a climate control system of the vehicle, and in which one of the parameters is a temperature within an area of the vehicle, and said vehicle control system is configured to automatically activate the climate control system of the vehicle when the temperature within the area of the vehicle has reached a predefined upper or lower temperature level, and to automatically control the climate control system in order to achieve predefined environmental conditions within said area.

16. The vehicle control system according to claim 10 in which one of the other vehicle systems is a climate control system of the vehicle, and in which the parameters are predefined environmental conditions within an area of the vehicle, and said vehicle control system is configured to automatically deactivate the climate control system of the vehicle when the predefined environmental conditions within the area of the vehicle have been achieved.

17. The vehicle control system according to claim 10 in which the vehicle control system is operable to automatically lock or unlock one or more doors of the vehicle.

18. The vehicle control system according to claim 10 in which the vehicle control system comprises a communication module operable to enable the remote operation of the control system.

19. The vehicle control system according to claim 16 in which the predefined environmental conditions are temperature and humidity.

20. The vehicle control system according to claim 18 in which the vehicle control system is configured to send data which comprises at least one of a charge state of the battery, fuel level of the vehicle, and location of the vehicle via the communications module.

* * * * *